United States Patent [19]

Samuelson et al.

[11] Patent Number: 4,749,430

[45] Date of Patent: Jun. 7, 1988

[54] METHOD OF MAKING AN ENCAPSULATED ASSEMBLAGE

[75] Inventors: Gay M. Samuelson, Tempe, Ariz.; David J. St. Clair; Richard L. Danforth, both of Houston, Tex.

[73] Assignee: Shell Oil Company, Houston, Tex.

[21] Appl. No.: 919,919

[22] Filed: Oct. 16, 1986

[51] Int. Cl.$^4$ ............................................. B29C 47/04
[52] U.S. Cl. ........................ 156/244.11; 156/244.12; 156/244.21; 156/244.24; 156/285; 427/407.2; 428/405; 428/407; 428/429; 65/60.2; 65/60.8
[58] Field of Search ................. 156/244.11, 244.12, 156/244.21, 244.23, 244.24, 285; 65/60.1, 60.2, 60.3, 60.8; 427/384, 407.2; 428/405, 407, 429

[56] References Cited

U.S. PATENT DOCUMENTS

| | | | |
|---|---|---|---|
| 3,595,942 | 7/1971 | Wald et al. | 260/880 |
| 3,984,369 | 10/1976 | Harian, Jr. et al. | 260/33.6 |
| 4,019,887 | 4/1977 | Kirkbride et al. | 65/60.8 |
| 4,101,482 | 7/1978 | Doss et al. | 260/27 |
| 4,101,483 | 7/1978 | Moskal | 260/27 |
| 4,101,484 | 7/1978 | Doss | 260/27 |
| 4,188,444 | 2/1980 | Landau | 65/60.8 |
| 4,207,359 | 6/1980 | Hanson et al. | 427/195 |
| 4,238,041 | 12/1980 | Jonsson et al. | 65/60.2 |
| 4,262,161 | 4/1981 | Carey | 136/256 |
| 4,296,008 | 10/1981 | St. Clair et al. | 260/27 |

FOREIGN PATENT DOCUMENTS

| | | | |
|---|---|---|---|
| 723622 | 12/1965 | Canada | 156/244.21 |
| 0076214 | 5/1984 | Japan | 156/244.21 |

Primary Examiner—Caleb Weston
Attorney, Agent, or Firm—Wendy K. B. Buskop

[57] ABSTRACT

An encapsulated assemblage and a process for making comprising:
(a) silanizing a substrate;
(b) coating the silanized substrate with at least one thin extruded coherent film consisting essentially of:
  (1) about 75–90 parts by weight of:
    (a) about 65 to about 75 parts of a selectively hydrogenated two-block polymer (A-B) such that prior to hydrogenation,
      (1) each A is a polymer block of a monovinyl or alpha alkyl monovinyl arene having a number average molecular weight of 5000 to 75,000 and comprising from about 10 to about 40% by weight of the total block copolymer, and
      (2) each B is a polymer block having a number average molecular weight of 10,000 to 150,000 and comprising from about 90 to about 60% weight of the total block copolymer, and
    (b) about 25 to about 35 parts by weight of a selectively hydrogenated multiblock copolymer (A-B) such that:
      (1) each A is a polymer endblock of a monovinyl or alpha alkyl monovinyl arene having a number average molecular weight of 5,000 to 75,000, said A blocks comprising from about 10 to about 40% by weight of the total block copolymer, and
      (2) each B is a polymer midblock having a number average molecular weight of 10,000 to 150,000 and is formed by polymerizing a conjugated diene having from 4 to 10 carbon atoms per molecule, and said B blocks comprising from about 90 to about 10% weight of the total block copolymer and
  (2) about 9.5 to about 23.5 parts by weight of a hydrogenated α-methyl styrene polymer resin;
  (3) about 0.5 to about 1.5 parts by weight of a phenolic antioxidant, a UV absorber with benzotriazole functionality, and a UV absorber with hindered amine functionality;
(c) vacuum laminating the assemblage; and
(d) heat sealing said assemblage.

9 Claims, 5 Drawing Sheets

METHOD OF MAKING AN ENCAPSULATED ASSEMBLAGE

FIELD OF THE INVENTION

This invention relates generally to encapsulated assemblages using a novel thermoplastic film and to a method of making the encapsulated assemblages.

BACKGROUND OF THE INVENTION

Encapsulated assemblages of thermoplastic films are known. For example, U.S. Pat. No. 4,262,161 discloses a solar cell assemblage prepared using a transparent film comprised of a block copolymer having at least two monoalkenyl arene polymer end blocks A and at least one polymer mid block B selected from the group consisting of substantially completely hydrogenated conjugated diene polymer blocks, ethylene-propylene polymer blocks and ethylene-butene polymer blocks between the cover plate and the electrical contact of the solar cell.

Even though this film provides good weather resistance for the resultant solar cell assemblage, it has been long desired to develop a new and novel film for use in all types of encapsulated assemblages which (1) is transparent to sunlight; (2) is resistant to ultraviolet degradation, (3) has good refractive index; (4) has low water absorption/permeation properties; (5) acts as an electrical insulator; (6) is heat sealable; (7) has a wide service temperature range, preferably from about −40° C. to about 90° C.; (8) has good adhesion, giving a peel strength of up to 30 pounds per inch with cohesive failure; and (9) can be extruded or curtain coated onto suitably prepared glass or silicone-based substrates.

Known encapsulant films have been highly susceptible to delamination from the base substrates and as a result have had low peel strength, in the range of less than 10 pounds per inch with adhesive failure. A need has long existed to prepare encapsulated assemblage with a film capable of achieving a peel strength of over 10 pounds per inch with cohesive, not adhesive, failure.

While polyvinylbutyral (PVB) and polyethylene/vinylacetate (EVA) are typical encapsulants, they have certain failures which have not been overcome prior to the development of the present encapsulant system. PVB is hygroscopic which requires careful control of temperature and humidity during storage and conditioning and during sheeting operations in a manufacturing environment. Failure to control the atmosphere results in poor laminations due to voids formed from outgassing of absorbed water. The moisture sensitivity of PVB is unacceptable in several product specifications. EVA has three basic problems, first a need for peroxide catalyzed crosslinking to achieve creep resistance. Since the peroxide in the film is relatively volatile, its concentration in the film in free sheet form, which determines the ultimate level of crosslinking, can vary, (see description in I. E. du Pont de Nemours & Co., Technical Guide, Elvax 150 EVA-Solar Photovoltaic Module Pottant, J. D. Pomije). Thus, the degree of crosslinking, can vary in EVA and it is difficult to test this parameter in certain in-line production processes. A second concern is the time needed to achieve sufficient crosslinking of EVA, which is not consistent with a high throughput production lamination cycle time. Thirdly, while peroxide is volatile in a free-standing film, it is not so volatile that all unused peroxide is removed during lamination which could compromise the longevity of some module packaging materials like edge sealants.

The problems alluded to with PVB and EVA have led to the search for an alternative encapsulant that is easily controlled in a high throughput manufacturing setting and is at least at reliable as PVB and EVA.

U.S. Pat. No. 3,984,369 discloses a composition which could be used as a sealant and which had good substrate/sealant adhesion, good UV stability, good peel strength in tests against glass, and useful hardness, tensile and flexibility properties. This novel sealant comprised:

(a) about 3 to 30 percent by weight of an elastomeric ABA type poly($\alpha$-monoalkenyl arene)/hydrogenated poly(conjugated diene) block copolymer having at least two poly($\alpha$-monoalkenyl arene) A blocks wherein the average molecular weight of the arene blocks is 4,000 to 50,000; the average molecular weight of the poly(conjugated diene) B block is 18,000 to 250,000; the conjugated diene block contains at least 20%, 1,2 bonds prior to hydrogenation; and at least 98% of the double bonds present in the conjugated diene blocks are saturated during hydrogenation, (b) about 2 to 40 percent by weight of a butyl rubber;

(c) about 1 to about 70 percent by weight of an oil having a solubility parameter of from about 6 to about 8;

(d) about 1 to about 50 percent by weight of an adhesion promoting resin having a solubility parameter of from about 8 to about 12;

(e) about 0 to about 70 percent by weight of an inorganic filler; and (f) about 0.01 to about 2.0 percent by weight of an oxidation stabilizer.

Even though this composition had good UV stability and it does not undergo covalent crosslinking, the adhesion of the compositions containing little or no butyl rubber was poor, giving only low peel strength and failing by the undesirable adhesive failure mechanism. The reason for this is that the ABA type polymers are very strong, making it impossible to achieve a composition which will fail by the desired cohesive failure mechanism. Compositions based on an ABA type polymer can be quite high in viscosity making them difficult to extrusion coat onto a substrate. An alternative method of applying these high viscosity compositions is to mix the composition in an extruder, grind it to form a powder, which is then applied directly to the desired object and heat fused onto the object assemblage or system forming the desired encapsulant coating. One such process is described in U.S. Pat. No. 4,207,359. This method has involved a variety of steps and it has been long desired to have a composition which can be extruded directly onto the desired substrate.

Another novel composition, taught in U.S. Pat. No. 4,296,008, involved a sealant composition with improved adhesion and melt flow properties based on the lower viscosity A'B'/ABA type block polymer. This sealant composition comprised:

(a) 100 parts by weight of a selectively hydrogenated block copolymer component comprising and A'B' block copolymer and an ABA type multiblock copolymer having at least two end blocks A and at least one mid block B wherein the A' and A blocks are monoalkenyl arene polymer blocks and the B' and B blocks are substantially completely hydrogenated conjugated diene polymer blocks, the number average molecular weight of the A' and A blocks are between about 3,000 and about 7,000 and the monoalkenyl arene content of the multiblock copolymer is between about 7% and about 22% by weight, wherein the weight ratio between the A'B' block copolymer and the ABA type multiblock copolymer is from about 20:80 to about 60:40;

(b) about 50 to about 350 parts by weight of a tackifying resin compatible with block B;

(c) about 0 to about 100 parts by weight of a plasticizer; and (d) about 0.1 to about 10 parts by weight of a silane coupling agent.

To insure good adhesion between a pottant based on an ABA type block copolymer and a substrate, the pottant must contain an adhesion promoting tackifying resin. To maintain good adhesion and impact resistance in the solar cell at low temperatures, the pottant must have a low glass transition temperature ($T_g$). The $T_g$ of the hydrogenated polybutadiene B block of the block copolymer is $-58°$ C. by differential scanning calorimety (DSC). The $T_g$ of a typical 95° C. softening point tackifying resin is about 45° C. The $T_g$ of the pottant comprised of a blend of ABA type block copolymer and tackifying resin will be intermediate between the $T_g$'s of the polymer and the resin and will depend on the relative proportions of polymer and resin in the blend. If it is necessary to maintain low $T_g$ in the pottant (e.g. $-30°$ C.), only a limited amount of the high $T_g$ resin can be included in the composition. The relatively high percentage of ABA type block copolymer required in the composition to insure low $T_g$ causes the melt viscosity of the pottant to be very high, making it difficult to extrusion coat the pottant onto a surface.

To overcome this problem of high viscosity, it was discovered that the block copolymer used in the pottant must be of the ABA/A'B' type. The A'B' type diblock copolymers have much lower melt viscosity than do the ABA type multiblock copolymers. It was found that by using a block copolymer containing about 30/70 ratio of ABA/A'B' block copolymers, a pottant could be made containing a limited amount of tackifying resin which had good adhesion and low $T_g$ and which could be readily extrusion coated onto a substrate. Even though the novel composition could be extruded and applied to a variety of substrates such as glass or silicone release coated paper, the discovery of this novel composition was not enough to enhance the development of encapsulant systems or encapsulant assemblages, in general.

To overcome these described disadvantages, a silane treatment was developed to be used in combination with this novel extrudable composition. The development of a silanization procedure, i.e. a pretreatment procedure that promotes the adhesion of this novel composition to a substrate so the encapsulant can endure prolonged humidity and freezing cycles, was a critical discovery. This discovery resulted in a method for preparing encapsulant systems and encapsulated assemblages with improved durability, as well as a variety of other features. Furthermore, this novel method of improving the adhesion of this novel thermoplastic film to many substrates can be extended to a variety of end uses. For example, automotive safety glass can be prepared with the novel silane pretreatment and the novel film to enhance passenger safety and add an additional cover to the glass to prevent harm to passengers and drivers in the car, should they contact the automotive glass. Similarly, this novel film can be applied to glass containers to prevent shattering, such as for pressurized soft drink bottles as well as for non-pressurized bottles such as milk bottles.

TERMS

Various terms of art will be utilized throughout this specification.

The term "silanized substrates" refers to a substrate which has been pretreated with a silane washing solution.

SUMMARY OF THE INVENTION

A process for making an encapsulated assemblage comprising:

(a) silanizing a substrate thereby forming a silanized substrate;

(b) coating said silanized substrate with at least one thin extruded coherent film forming a coated substrate, said film consisting essentially of:
  (1) about 75 to about 90 parts by weight, or more preferably 78.5 to 89.5 parts by weight of a blend of:
    (a) about 65 to about 75 parts by weight of a selectively hydrogenated two-block polymer wherein one polymer block is designated by A and a second polymer block is designated by B such that prior to hydrogenation,
      (1) each A is a polymer block of a monovinyl or alpha alkyl monovinyl arene having a number average molecular weight in the range of from about 5,000 to about 75,000 said A blocks comprising from about 10 to about 40% by weight of the total block copolymer, and
      (2) each B is a polymer block having a number average molecular weight in the range of from about 10,000 to about 150,000 and is formed by polymerizing a conjugated diene having from 4 to 10 carbon atoms per molecule, and said B blocks comprising from about 90 to about 60% weight of the total block copolymer, and
    (b) about 25 to about 35 parts by weight of a selectively hydrogenated multiblock copolymer which contains at least two kinds of polymer blocks wherein one polymer block is designated by A and a second polymer block is designated by B such that:
      (1) each A is a polymer endblock of a monovinyl or alpha alkyl monovinyl arene having a number average molecular weight in the range of from about 5,000 to about 75,000 said A blocks comprising from about 10 to about 40% by weight of the total block copolymer, and
      (2) each B is a polymer midblock having a number average molecular weight in the range of from about 10,000 to about 150,000 and is formed by polymerizing a conjugated diene having from 4 to 10 carbon atoms per molecule, and said B blocks comprising from about 90 to about 10% weight of the total block copolymer, and
  (2) about 9.5 to about 23.5, or more preferably about 10 to about 20 parts by weight of a hydrogenated (alpha)-methyl styrene polymer resin;
  (3) about 0.5 to about 1.5 parts by weight of a phenolic antioxidant, a UV absorber with benzotriazole functionality, and a UV absorber with hindered amine functionality;

(c) applying a vacuum to the assemblage thereby forming a pressure gradient between said substrate and said film, and thereby vacuum laminating the assemblage; and (d) heating said vacuum laminated assemblage to a temperature greater than the softening point of said film and less than the melting point of the polymer and thereby heat sealing said assemblage.

DESCRIPTION OF THE PREFERRED EMBODIMENTS

Figure 1:
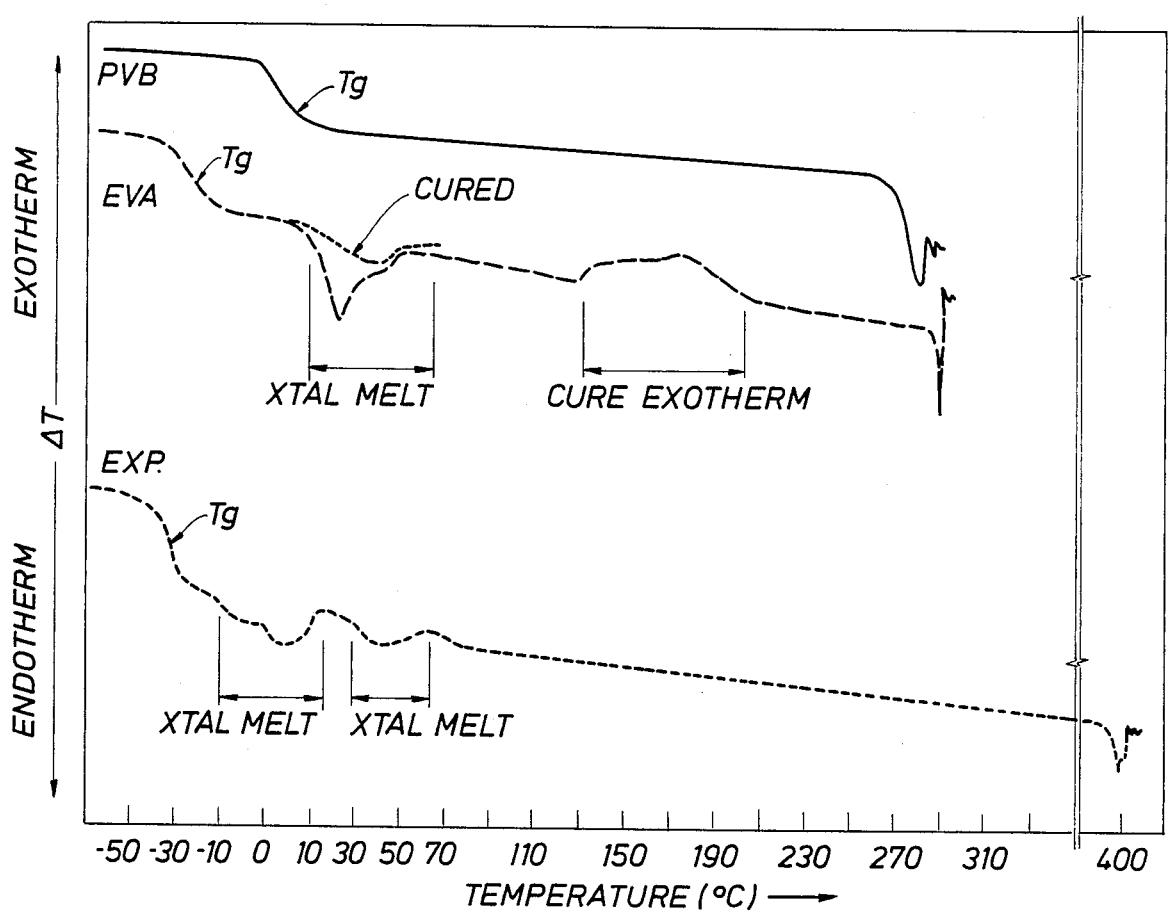
FIG. 1 is a graph which illustrates decomposition temperatures for three comparable elastomeric films laminated on glass, PVB, EVA and the experimental film.

The present invention involves an encapsulated assemblage and a method of making an encapsulated system, which uses a coherently extruded, heat sealable, elastomeric film. This is a novel thermoplastic block copolymer which has elastic and resilient properties similar to vulcanized rubber.

The thermoplastic block copolymers useful in the present invention are known as SBS or SEBS copolymers. SBS copolymers generally are polystyrene-polybutadiene-polystyrene copolymers. SEBS copolymers are generally polysytrene-poly(ethylene/butylene)-polystyrene copolymers. Thermoplastic copolymers of this type are well known in the art. For example, U.S. Pat. No. 3,595,942 describes typical SBS polymers as well as suitable hydrogenation methods for hydrogenating these copolymers. The structure of the copolymers is generally determined by their method of polymerization.

The use of hydrogenated and non-hydrogenated thermoplastic copolymers in sealants has been demonstrated. See, U.S. Pat. No. 4,101,482 which describes the use of hydrogenated thermoplastic copolymers and U.S. Pat. Nos. 4,101,482, 4,101,483 and 4,101,484 which describe sealants made with non-hydrogenated styrene-diene copolymers. These known sealant compositions, have not provided the balance of adhesion, stability and processability currently desired for the present end use.

The novel, heat sealable, extrudable coherent film usable in the present invention, has the following composition:

TABLE 1

| Ingredient | Composition of Exp. Film parts by weight |
|---|---|
| Novel copolymer | 78.7 |
| Tackifying resin | 19.7 |
| Antioxidant | 1.0 |
| UV absorber with benzotriazol functionality | 0.3 |
| UV absorber with hindered amine functionality | 0.3 |

The copolymer in the preferred embodiment is Kraton ® G 1726, which contains 30% by weight of SEBS copolymer and 70% by weight of an SEB copolymer. In the most preferred embodiment, the SEB copolymer is about half the molecular weight of the SEBS copolymer. Kraton ® G 1726 is a product of the Shell Chemical Company, Houston, Tex.

The tackifying resin of the preferred embodiment is Regalrez ® 1094, which is a hydrogenated α-methyl styrene polymer resin which is added to tackify the formulation while providing good UV and oxidative stability. Regalrez 1094 is a product Hercules, Inc. of Wilmington, Del. An alternative tackifying resin is Arkon P85, which is also a hydrogenated α-methyl styrene polymer resin usable within the scope of the invention. This resin is available from ARAKAWA Chemical Company of Japan.

The preferred antioxidant is one which has hindered phenolic functionality. Preferably, it is a tetrakis[methylene 3,5-di-tertbutyl-4-hydroxy hydrocinnamate]methane, such as Irganox ® 1010, made by Ciba-Geigy.

A preferred UV stabilizer package is one containing two components, 2(2'-hydroxy-5'-methyl phenyl)benzotriazole, such as Tinuvin ® 327, and a hindered amine light stabilizer, such as Tinuvin 770. Both Tinuvin 327 and Tinuvin 770 are products of Ciba-Geigy.

The film is prepared by feeding the individual components of Table 1 into a twin screw extruder, to achieve blending and eliminate taking which is usually associated with pre-blending of these types of elements. The mixture can be heated and pumped through a die. A typical die would be 18 inch (457 mm) in width. Once through the die, the extruded material can be passed onto chilled rollers, and then would onto silicone release paper. Alternatively, the material can be pumped directly onto silanized substrate, silicone coated release paper or a polymeric laminate.

The present invention was developed to provide a novel film composition capable of being extrusion applied to glass or to silicone release coated substrates to be wound up on take-up rolls and later used for preparing solar cells and solar cell strings. With thes advantages, the novel film has utility for a variety of end uses.

It has been further discovered that the adhesion of this novel film to a glass substrate is enhanced by pretreating the glass with a silane pretreatment procedure. This silanization procedure enables good adhesion of the novel film to the substrate, adhesion which can sustain a greater than 10 pounds per inch peel strength under prolonged exposure to humidity. Substrates which can be pretreated with this novel silanizaction process can include glass, aluminum, steel or any material that contains surface hydroxyl groups.

To silanize a substrate with surface hydroxyl groups, wash the substrate, preferably a plate of glass, in a first solution prepared from 4 drops of Basic H to 450 ml. distilled water. After washing, rinse the substrate in distilled water and then subject the substrate to a second solution consisting of a 1:1 ratio of $HNO_3:H_2O$. After application of the second solution, rinse the substrate with distilled water. Next, spin coat the substrate with a solution of about 2% (w/w) amino ethyl amino propyltrimethoxy silane in 95/5% (V/V) ethanol/water. After spin coating the substrate, bake the substrate in an air convection oven for 10 minutes at 110° C.

This silanization procedure just described can be modified for use in numerous types of manufacturing settings. The procedure can be modified wherein the silane is added to the rinse water tank of a commercial glass washer to achieve a solution of about 0.5% (V/V). The silane solution could then be replenished in accordance with the water refresh rate of about 5 gal. per hour.

This silanization procedure can be modified wherein a prewashed substrate can be sprayed with the first and second solution described above, instead of washing, as a prelude to curtain coating or extrusion coating the film onto the substrate. The activation of silane on the substrate, that is, the hydrolysis of methoxy groups and covalent bond formation to surface hydroxy groups, can be accomplished in the drying phase after spraying. Alternatively, covalent bonds can be developed between the silane coat and substrate during heat sealing or film lamination treatment.

The use of a silane coupling agent to bond hydrogenated and non-hydrogenated styrene-diene copolymers in a composition was disclosed in U.S. Pat. No. 4,296,008. In that reference, the silane improved the water resistance of the resultant sealant composition. Silane coupling agents are generally ambifunctional molecules with the unique ability to improve the bond between organic polymers and many mineral surfaces, and to retain composite properties after prolonged exposure to moisture. Silane coupling agents have not been used extensively in hot melt end use applications.

Chemically, silane coupling agents are hybrid materials that possess the dual functionality of an organic functional group at one end of the molecule and the hydrolyzable silanol functionality on the opposite end. Generally, all silane coupling agents can be represented by the formula $(RO)_3Si\ X$. In this formula, X represents a functional organic group such as chlorine, mercaptan, amines or diamines, epoxy, vinyl, or methacrylate. These reactive organic groups are attached through a stable carbon linkage, usually a $(CH_2)_3$ group, to the silicon. At the silicon or inorganic end of the molecule are hydrolyzable alkoxy or acetoxy groups (RO). These methoxy or acetoxy groups on silicon undergo rapid hydrolysis in aqueous solutions, or upon exposure to moist air to form the reactive SiOH (silanol) functionality. Thus, two quite different chemically reactive groups are at opposite ends of the same silane coupling agent molecule.

Once the silanization process is completed the extruded film can be coated onto the pretreated substrate. The combination of pretreated substrate and the coating of extruded film can be called a coated substrate.

This novel coated substrate can be compared with conventional systems which use PVB or EVA but which do not use either this silanization pretreatment process or the novel film composition. FIG. 1 is a graph which compares the characteristics of the novel encapsulant system (hereinafter denoted as EXP. Coating) and a PVB encapsulant system, (here Monsanto's Saflex SR-15 PVB) and an EVA system, (here Springborn's A-9918 EVA). FIG. 1 presents the thermal profiles for each of the three systems as assessed by differential scanning calorimetry performed in nitrogen ($N_2$). This technique shows whether the glass transition temperature ($T_g$), cure exotherm and decomposition temperatures are compatible with lamination conditions and module service temperatures. As can be seen in FIG. 1, PVB has a relatively high $T_g$ of 19° C. and a gradual softening endotherm to its decomposition temperature of 303° C. EVA has a $T_g$ of −24° C. with two regions of crystal melt in the range 43°-60° C. EVA has a cure exotherm in the region 150°-220° C. and a softening endotherm to a decomposition temperature of 309° C. The Exp. coating on the other hand, has no cure exotherm. It has a $T_g$ of −30° C., some region of melt endotherm, which may be related to crystallinity, and a gradual softening to a decomposition temperature of 400° C.

Figure 2:
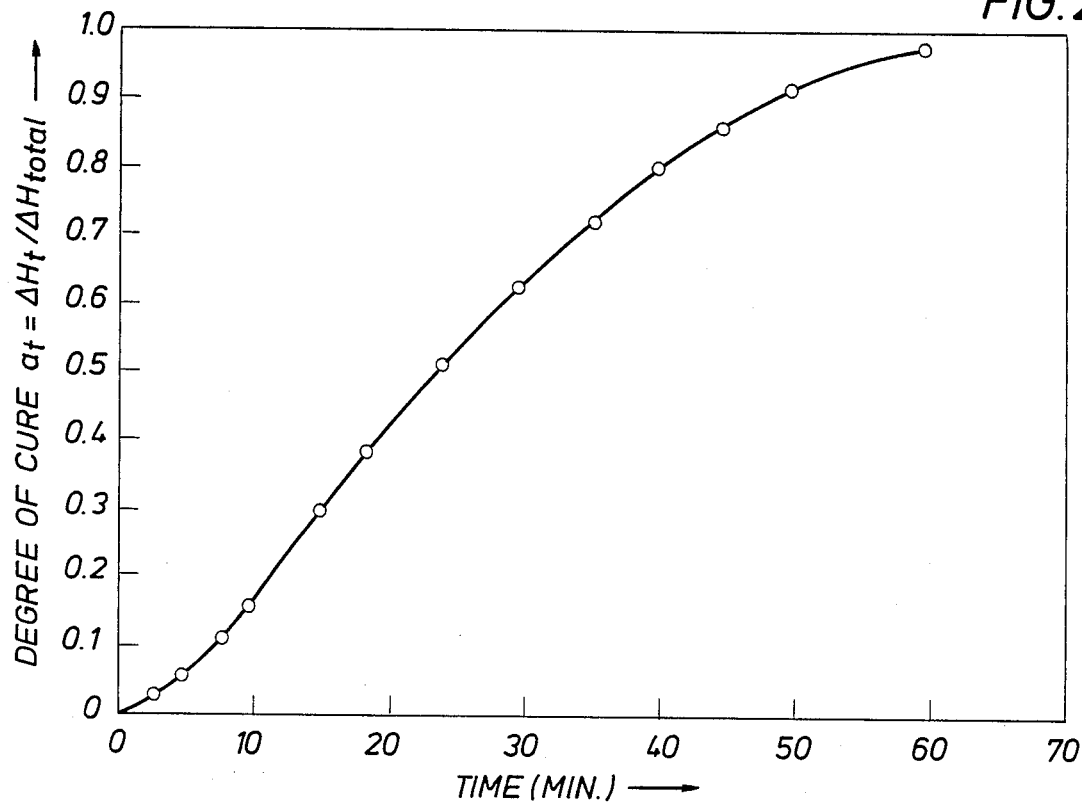
FIG. 2 is a graph illustrating the cure kinetics of EVA with an in-house lamination cycle time and temperature.

The kinetics of cure of this particular EVA were also measured by differential thermal analysis by comparing the $\Delta H$ at time t to the total $\Delta H$ exotherm at a given temperature. It was critical to determine if the cure kinetics of this EVA were compatible with a given lamination cycle time and temperature. The results obtained at 170° C. are presented in FIG. 2. Even at 170° C., the time to achieve 15% crosslinking, which is considered to be a minimum for satisfactory creep resistance, is 10 min. Also only 50% of unused peroxide can be removed by as long as a 12 hour evacuation.

Figure 3:
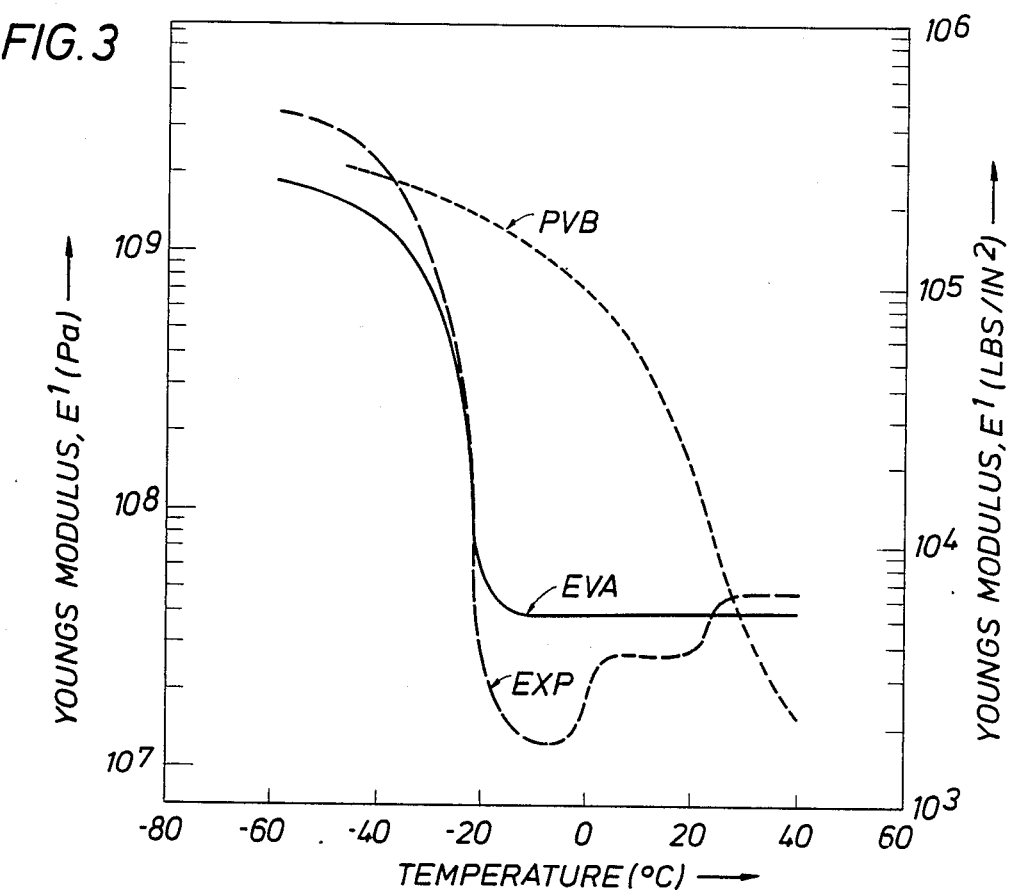
FIG. 3 is a graph which illustrates impact resistance of three elastomeric films, PVB, EVA and the experimental film when laminated in an identical method using the silanization procedure.
Figure 4:
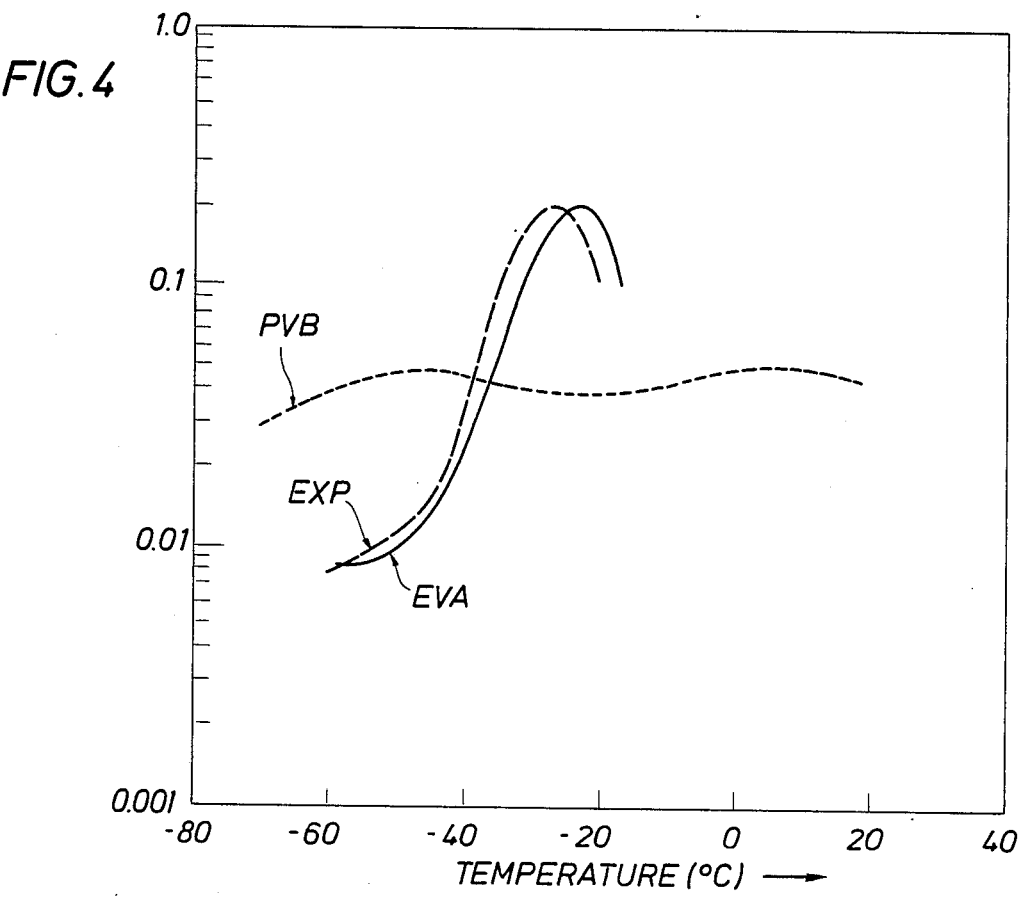
FIG. 4 is a graph which illustrates creep resistance of laminated PVB, EVA and experimental film assemblies when heated at a rate of 5° C. per minute between −40° and 400° C. in an inert nitrogen atmosphere.

The determination of Young's modulus and tan $\delta$ as a function of temperature were made using dynamic mechanical analysis to ascertain whether impact resistance for each system was good in the module service temperature range (FIG. 3). Modulus (E') vs temperature for each of these same three systems is presented in FIG. 3. E' for PVB, EVA and the Exp. coating at 0° C. was found to be $7.7 \times 10^8$, $4 \times 10^7$ and $1.5 \times 10^7$ Pa, respectively. The corresponding tan $\delta$ data is presented in FIG. 4. Both sets of data show that the Exp. coating system and this particular EVA system retain elastomeric properties at low temperature better than PVB and hence, provide better impact resistance at temperatures <0° C.

Creep resistance was indirectly measured by determining the penetration temperature of a quartz probe with a 1 gm load resting on the pottant sample. Each system was heated at a rate of 5° C./min between −40 and 400° C. in $N_2$. The data is presented in Table 2 below, and shows that creep resistance in EVA is a strong function of the degree of crosslinking in the rubber phase which consequently must be carefully controlled. Creep resistance in the Exp. coating can be varied by regulating the addition of the tackifying resin such as Regalrez 1094 or Arkon P85. Since the tackifying resin also promotes adhesion by reducing viscosity, a compromise between this property and creep resistance is well within the acceptable range for both parameters.

TABLE 2

| TMA PENETRATION TEMPERATURE | |
|---|---|
| Encapsulant | Temperature, °C. |
| PVB | 110 |
| EVA, 100% rubber phase of film - linked | no penetration |

TABLE 2-continued

| TMA PENETRATION TEMPERATURE | |
|---|---|
| Encapsulant | Temperature, °C. |
| EVA, 52% rubber phase of film - linked | to 250° C. no penetration to 250° C. |
| EVA, 15% rubber phase of film - linked | 44 |
| EXP, 0% tackifying resin | 148 |
| EXP, 20% tackifying resin | 135 |
| EXP, 40% tackifying resin | 102 |
| EXP, 70% tackifying resin | 80 |

The adhesion of each system was determined by measuring the peel strength of 1" strips pulled from a substrate of glass with and without the described amino silane treatment. The PVB and EVA values were comparable at 25±5 lbs/in. when silanized glass was used for EVA. Silane promoted adhesion of the Exp. coating particularly for the formulation given in Table 1 wherein an adhesion of 30±3 lbs/in. was measured.

The reliability of each of these coatings as encapsulant candidates was assessed by measuring water absorption-permeation and oxidative and UV stability. Furthermore, the effect of thermal aging at 150° C. on light transmission at 435 nm was measured.

Water absorption was measured by weight gain following a 1 week water soak at 25° C. Only PVB had measurable water uptake which was 6.25%.

Water permeation was measured by ASTM E-96-66 and the results are presented in Table 3. The Exp. coating is an order of magnitude less water permeable than either PVB or EVA.

The oxidative stability of the three systems was measured by thermo gravimetric analysis performed in $O_2$ and the results are shown in Table 4.

TABLE 3

| WATER PERMEABILITY OF PVB, EVA, SSP | |
|---|---|
| | Permeability (metric perm. cm) |
| PVB | 3.76 ± .10 E-2 |
| EVA | 2.09 ± .04 E-2 |
| EXP | 0.27 ± .02 E-2 |

TABLE 4

| OXIDATIVE STABILITY | |
|---|---|
| | T decomposition °C. |
| PVB | 337 ± 16 |
| EVA | 234 ± 2 |
| EXP | 352 ± 16 |

Figure 5:
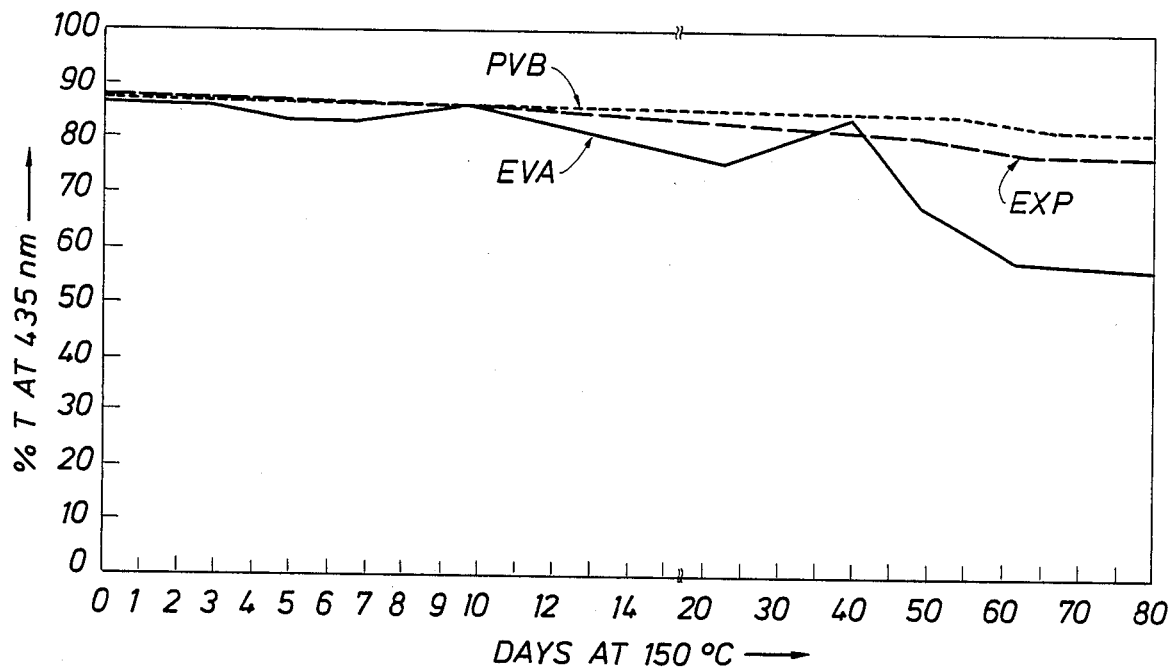
FIG. 5 is a graph which illustrates the oxidative stability of the three laminated systems wherein the experimental film laminate system has greater oxidative stability than the laminated PVB system or the laminated EVA system.

The order of decreasing oxidative stability is EXP>PVB>EVA. The effect of oxidative stability on light transmission at 435 nm for 30 mil samples encapsulated between two pieces of AFG Solite glass is presented in FIG. 5 as a function of 150° C. thermal aging. It is evident that discoloration is affecting transmission of EVA after approximately 50 days.

The UV stability of three encapsulant systems was measured by irradiating samples sandwiched between two NaCl plates. The UV source was a 350 W Hg lamp with an irradiance at 365 nm of 12 mW/cm². One set of samples was irradiated directly and a second set was irradiated with ⅛" thick, low iron, AFG Solite glass intervening between source and sample. In the latter case no detectable IR changes were observed even after 976 hours of exposure. In the former case, IR-detectable changes were observed after 810 hours for all three encapsulant systems, although the results were most dramatic for PVB and EVA.

Figure 6:
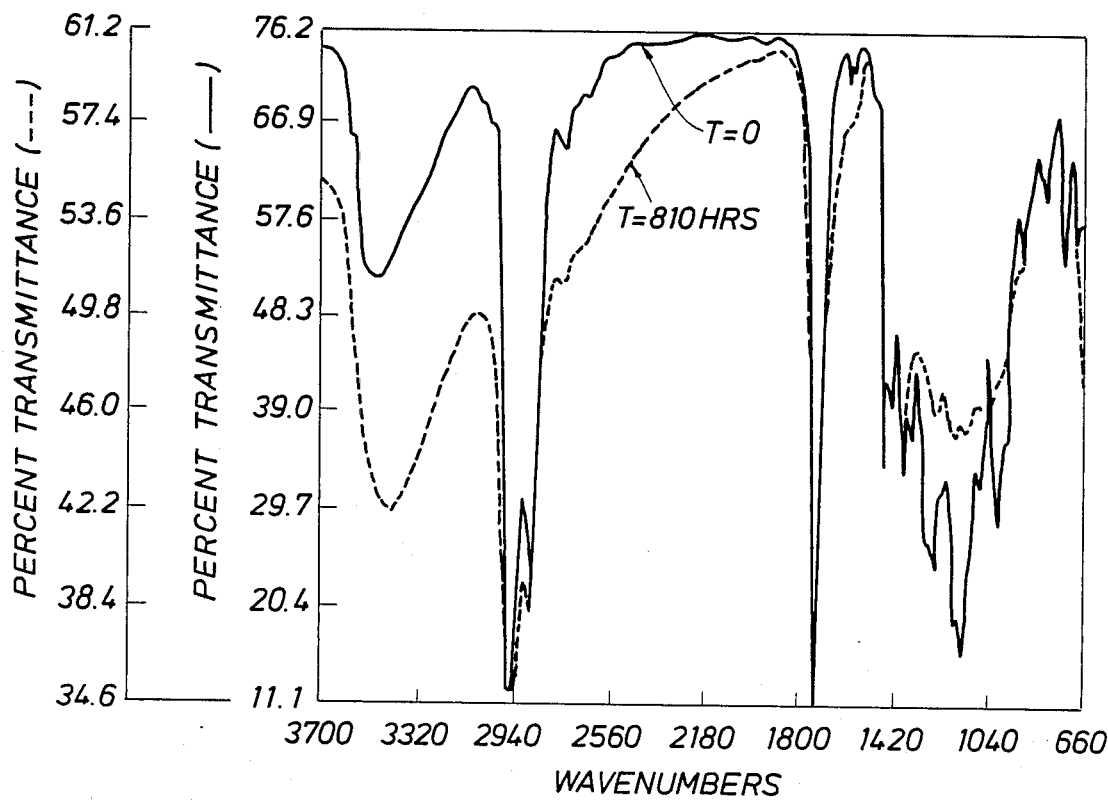
FIG. 6 illustrates the IR spectra of PVB at times zero and after 810 hours UV exposure.

FIG. 6 shows the IR spectra of PVB at time zero and after 810 hours of UV exposure. The most significant change is the loss of phthalate plasticizer as evidenced by the strong attenuation of the 1736, 1601, 1580, 1459, 1380, 1356, 1343, 1280–1285, 1138, 1073, 745 cm$^{-1}$ peaks. A second significant result is the formation of carboxylic acid seen from the broadening of the baseline from approximately 1780 to 3700 cm$^{-1}$ and the carboxylic hydroxyl at 3444 cm$^{-1}$. A likely explanation for the carboxylic development is the oxidation and hydrolysis of butyraldehyde to butyric acid leaving behind hydroxyls which could contribute to the 3444 cm$^{-1}$ peak. Absorbed water could also contribute to the 3444 cm$^{-1}$ peak and the 1603 cm$^{-1}$ peak.

Figure 7:
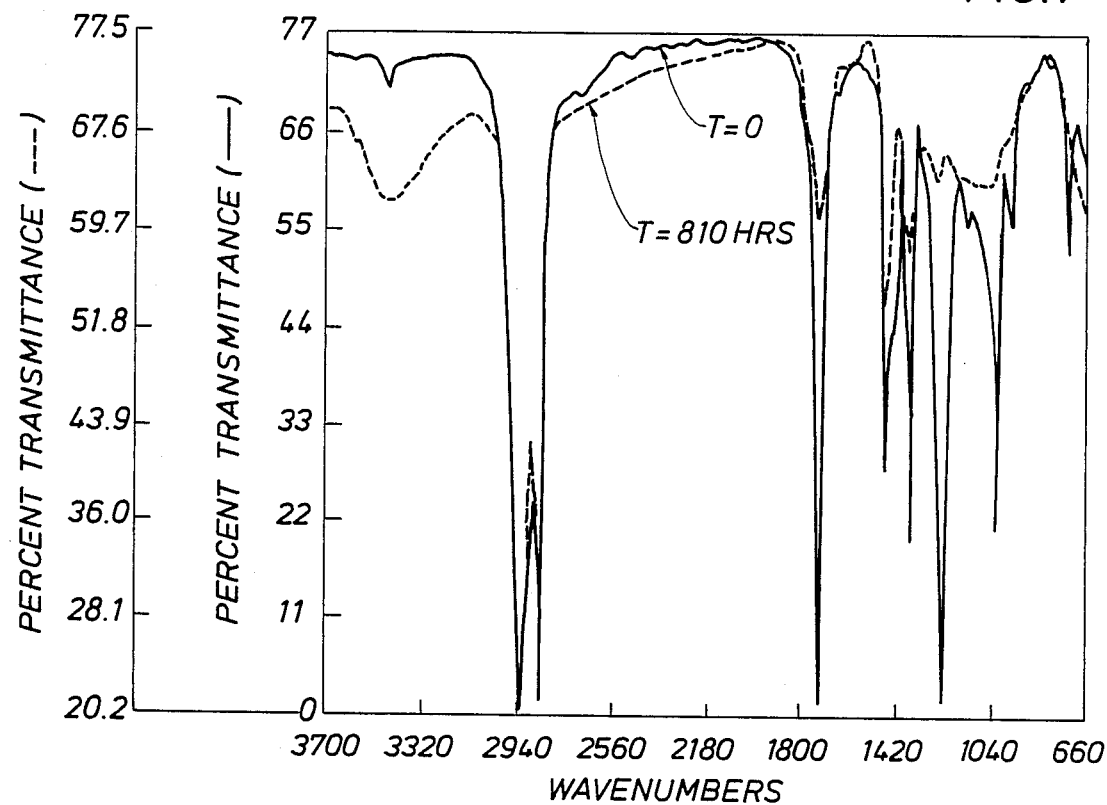
FIG. 7 illustrates the IR spectrum of EVA at times zero after 810 hours UV exposure.

FIG. 7 shows the IR spectra of EVA at time zero and after 810 hours of UV exposure. The significant change in this case is the loss of acetate as evidenced by the reduction of 1739, 1439, 1372, 1241, and 1021 cm$^{-1}$ peaks. Thus, it would appear that major hydrolysis of acetate is occurring to produce acetic acid. The 1767 cm$^{-1}$ shoulder is likely carboxylic acid carbonyl or perhaps vinyl acetate from polymer chain hydrolysis. The 3456 cm$^{-1}$ peak could be water and hydroxyl associated with carboxylic acid and/or vinyl alcohol resulting from main chain hydrolysis.

Figure 8:
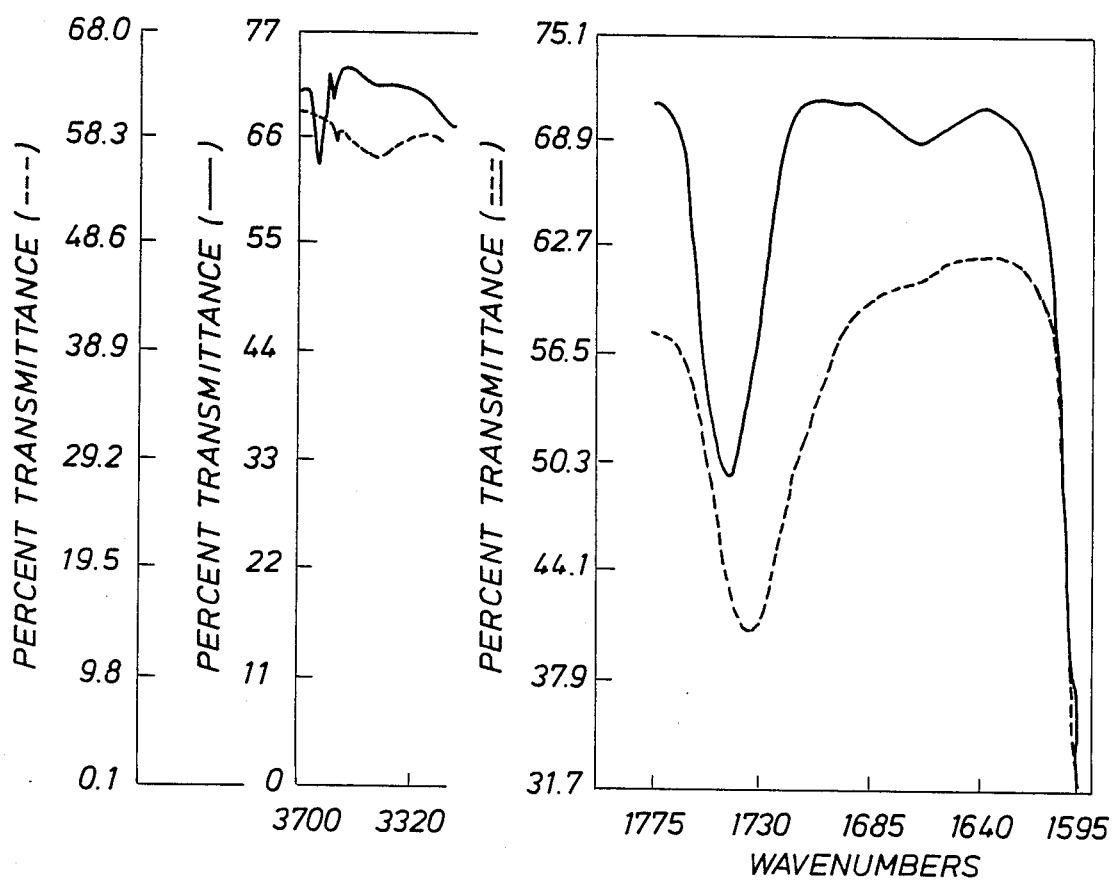
FIG. 8 is a partial IR spectrum of the experimental film at times zero and after 810 hours UV exposure.

FIG. 8 shows a blow-up of the only two regions of change in the spectrum of the EXP coating following 810 hours of UV exposure. There appears to be an increase in carbonyl at 1744 cm$^{-1}$ with a shift to 1735 cm$^{-1}$ and a broadening of the baseline. This could result from hydrolysis or mild oxidation. The second area of change is the increase in hydroxyl at approximately 3400 cm$^{-1}$. The overall change is consistent with the production of small quantities of carboxylic acid.

The IR-detectable changes occurring in PVB and EVA and, to a lesser extent in EXP are probably attributable to the short wavelength UV (<320 nm) normally absorbed by the glass in a photovoltaic panel. Nonetheless, the result shows EXP to be at least as UV stable, if not better, than either PVB or EVA for the accelerating conditions of UV exposure used.

Figure 9:
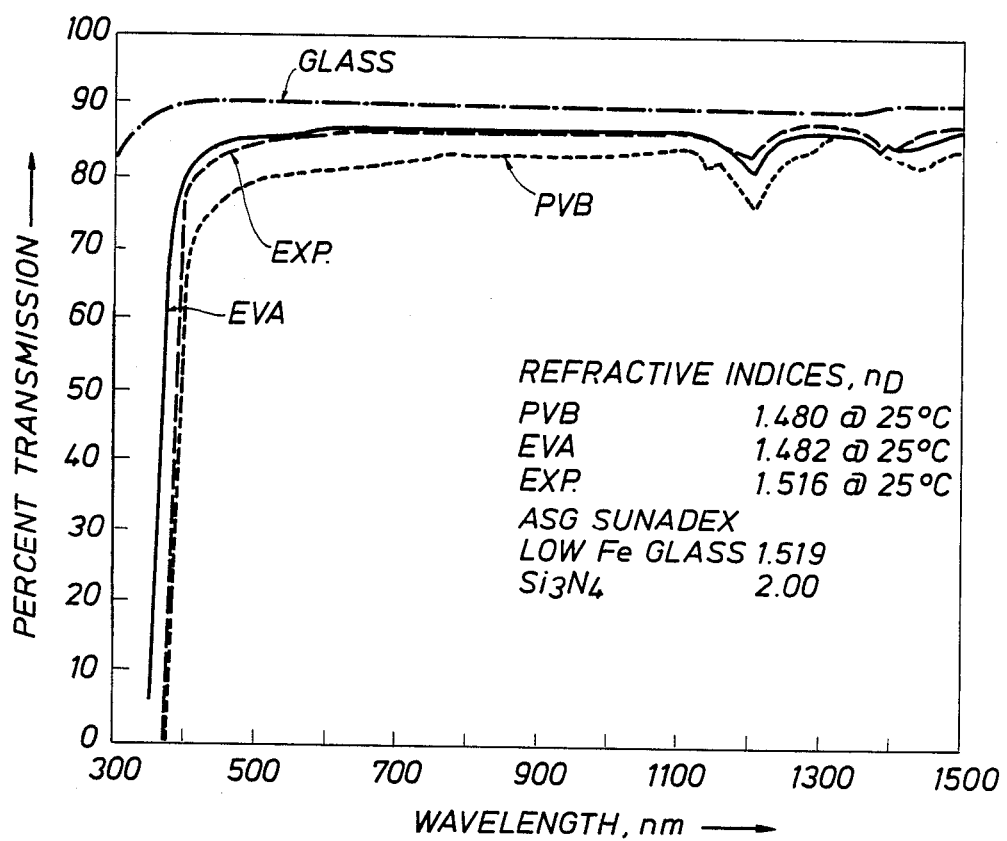
FIG. 9 is a graph which illustrates the percent of light transmission and UV stability versus wavelength for PVB, EVA and experimental film laminate systems.

The final property that was compared among the three candidates was the optical property of the light transmission in the UV, visible and near IR. Transmission as a function of wavelength is shown in FIG. 9 for 15 mil thick samples laminated in glass. The results show that the EXP coating has transmission comparable to EVA and both are slightly better than PVB.

The literature refractive index values for PVB (2) and EVA (3) are also presented in FIG. 9. The measured value of EXP coating is 1.516, which is slightly higher and better matched to silicon nitride anti-reflective coatings than either EVA or PVB.

As is readily observable, PVB has excellent adhesion properties, does not require cure and has a good reliability record in its use in automobile windshields for ~40 years. Its disadvantages are its propensity for water absorption which complicates handling procedures and occasionally produces voids on lamination. EVA has excellent adhesion, transmission and UV stability. Its disadvantage is the requirement for peroxide-catalyzed cure and the control of the degree of cure which guarantees creep resistance and over-all module longevity.

The novel and unobvious Experimental Coating is like PVB in that it does require cure. Unlike PVB, it does not have storage and handling properties related to water absorption. Its adhesion to glass is, however, sensitive to chemical formulation and film preparation techniques both of which have been developed to insure a reliable, viable alternative to PVB or EVA for encapsulant or laminate systems.

What is claimed is:

1. A process for making an encapsulated assemblage comprising:
   (a) silanizing a substrate thereby forming a silanized substrate;
   (b) coating said silanized substrate with at least one thin extruded coherent film forming a coated substrate, said film consisting essentially of:
      (1) about 75 to about 90 parts by weight of a blend of:
         (a) about 65 to about 75 parts by weight of a selectively hydrogenated two-block polymer wherein one polymer block is designated by A and a second polymer block is designated by B such that prior to hydrogenation,
            (1) each A is a polymer block of a monovinyl or alpha alkyl monovinyl arene having a number average molecular weight in the range of from about 5,000 to about 75,000, said A blocks comprising from about 10 to about 40% by weight of the hydrogenated two block copolymer, and
            (2) each B is a polymer block having a number average molecular weight in the range of from about 10,000 to about 150,000 and is formed by polymerizing a conjugated diene having from 4 to 10 carbon atoms per molecule, and said B blocks comprising from about 90 to about 60% weight of the hydrogenated two block copolymer, and
         (b) about 25 to about 35 parts by weight of a selectively hydrogenated multiblock copolymer which contains at least two kinds of polymer blocks wherein one polymer block is designated by A and a second polymer block is designated by B such that:
            (1) each A is a polymer endblock of a monovinyl or alpha alkyl monovinyl arene having a number average molecular weight in the range of from about 5,000 to about 75,000, said A blocks comprising from about 10 to about 40% by weight of the hydrogenated two block copolymer, and
            (2) each B is a polymer midblock having a number average molecular weight in the range of from about 10,000 to about 150,000 and is formed by polymerizing a conjugated diene having from 4 to 10 carbon atoms per molecule, and said B blocks comprising from about 90 to about 10% weight of the hydrogenated multi block copolymer, and
      (2) about 9.5 to about 23.5 parts by weight of a hydrogenated α-methyl styrene polymer resin;
      (3) about 0.5 to about 1.5 parts by weight of a phenolic antioxidant, a UV absorber with benzotriazole functionality, and a UV absorber with hindered amine functionality;
   (c) applying a vacuum to the assemblage thereby forming a pressure gradient between said substrate and said film, and thereby vacuum laminating the assemblage; and
   (d) heating said vacuum laminated assemblage to a temperature greater than the softening point of said film and less than the melting point of the polymer and thereby heat sealing said assemblage.

2. The process of claim 1, wherein said assemblage is heated to a temperature in the range of about 23° C. to about 180° C.

3. The process of claim 1, wherein said pressure gradient is in the range between about 1 and about 14.7 psi.

4. The process of claim 1, wherein said film disposed on said substrate is between about 15 and about 20 mils thick.

5. A process for coating a silicone-based, plate type substrate comprising:
   (a) disposing at least one layer of a thin extruded coherent film on at least one side of said substrate, said film comprising:
      (1) about 78.5 to about 89.5 parts by weight of a blend of:
         (a) about 65 to about 75 parts by weight of a selectively hydrogenated two-block polymer wherein one polymer block is designated by A and a second polymer block is designated by B such that prior to hydrogenation,
            (1) each A is a polymer block of a monovinyl or alpha alkyl monovinyl arene having a number average molecular weight in the range of from about 5,000 to about 75,000 said A blocks comprising from about 10 to about 40% by weight of the hydrogenated two block copolymer, and
            (2) each B is a polymer block having a number average molecular weight in the range of from about 10,000 to about 150,000 and is formed by polymerizing a conjugated diene and said B blocks comprising from about 90 to about 60% weight of the hydrogenated two block copolymer, and
         (b) about 25 to about 35 parts by weight of a selectively hydrogenated multiblock copolymer which contains at least two kinds of polymer blocks wherein one polymer block is designated by A and a second polymer block is designated by B such that:
            (1) each A is a polymer endblock of a monovinyl or alpha alkyl monovinyl arene having a number average molecular weight in the range of from about 5,000 to about 75,000 said A blocks comprising from about 10 to about 40% by weight of the hydrogenated two block copolymer, and
            (2) each B is a polymer midblock having a number average molecular weight in the range of from about 10,000 to about 150,000 and is formed by polymerizing a conjugated diene having from 4 to 10 carbon atoms per molecule, and said B blocks comprising from about 90 to about 10% weight of the hydrogenated multi-block copolymer, and
      (2) about 10 to about 20 parts by weight of a hydrogenated α-methyl styrene polymer resin;
      (3) about 0.5 to about 1.5 parts by weight of a phenolic antioxidant, a UV absorber with benzotriazole functionality, and a UV absorber with hindered amine functionality, on at least one side of said plate-type material;
   (b) heat sealing the film onto the plate-type substrate; and (c) cooling the heat sealed substrate to substantially ambient temperature.

6. The process of claim 5, wherein said silicone-based plate-type substrate is automotive safety glass.

7. A process for coating a glass container to prevent the scattering of glass fragments should the container shatter, said process comprising:

(a) applying at least one extruded, cohesive, thin, heat sealable, coherent film to the external wall of a glass container, said film essentially comprising a blend of:

(1) about 78.5 to about 89.5 parts by weight of a blend of:

(a) about 65 to about 75 parts by weight of a selectively hydrogenated two-block polymer wherein one polymer block is designated by A and a second polymer block is designated by B such that prior to hydrogenation, (1) each A is a polymer block of a monovinyl or alpha alkyl monovinyl arene having a number average molecular weight in the range of from about 5,000 to about 75,000 said A blocks comprising from about 10 to about 40% by weight of the hydrogenated two block copolymer, and (2) each B is a polymer block having a number average molecular weight in the range of from about 10,000 to about 150,000 and is formed by polymerizing a conjugated diene having from 4 to 10 carbon atoms per molecule, and said B blocks comprising from about 90 to about 60% weight of the hydrogenated two block copolymer, and (b) about 25 to about 35 parts by weight of a selectively hydrogenated multiblock copolymer which contains at least two kinds of polymer blocks wherein one polymer block is designated by A and a second polymer block is designated by B such that:

(1) each A is a polymer endblock of a monovinyl or alpha alkyl monovinyl arene having a number average molecular weight in the range of from about 5,000 to about 75,000, said A blocks comprising from about 10 to about 40% by weight of the hydrogenated two block copolymer, and (2) each B is a polymer midblock having a number average molecular weight in the range of from about 10,000 to about 150,000 and is formed by polymerizing a conjugated diene having from 4 to 10 carbon atoms per molecule, and said B blocks comprising from about 90 to about 10% weight of the hydrogenated multi block copolymer, and (2) about 10 to about 20 parts by weight of a hydrogenated α-methyl styrene polymer resin;

(3) about 0.5 to about 1.5 parts by weight of a phenolic antioxidant, a UV absorber with benzotriazole functionality, and a UV absorber with hindered amine functionality;

(b) heat sealing the film to the glass container; and (c) cooling said heat sealed glass container to substantially ambient temperature.

8. The process of claim 7, wherein said film has a thickness of about 20 mils.

9. The process of claim 7, wherein said glass container is preheated to temperatures in the range of about 100° C. and about 350° C. for between about 5 and about 12 minutes.

* * * * *